United States Patent [19]
Higashimoto

[11] Patent Number: 4,864,922
[45] Date of Patent: Sep. 12, 1989

[54] RAW MEAT PROCESSOR

[75] Inventor: Tsuyoshi Higashimoto, Ikoma, Japan

[73] Assignee: Higashimoto Kikai Co. Ltd., Japan

[21] Appl. No.: 222,423

[22] Filed: Jul. 21, 1988

[51] Int. Cl.$^4$ .............................. A23B 4/02; A23L 3/34
[52] U.S. Cl. ........................................ 99/533; 99/535
[58] Field of Search ................. 99/532, 533, 535, 487,
99/516; 17/25, 30; 426/281

[56] References Cited

U.S. PATENT DOCUMENTS

| | | | |
|---|---|---|---|
| 3,661,073 | 5/1972 | Schack et al. | 99/533 |
| 3,779,151 | 12/1973 | Ross | 99/533 |
| 3,922,357 | 11/1975 | Townsend | 99/533 X |
| 4,220,669 | 9/1980 | Townsend | 426/281 |
| 4,292,889 | 10/1981 | Townsend | 99/533 |
| 4,680,832 | 7/1987 | Langen | 17/25 |

FOREIGN PATENT DOCUMENTS 2366797 6/1978 France .................... 99/532

*Primary Examiner*—Timothy F. Simone
*Attorney, Agent, or Firm*—Kirschstein, Ottinger, Israel & Schiffmiller

[57] ABSTRACT

A raw meat processor for injecting a pickle into masses of raw meat and cutting the fibers of the raw meat. The raw meat processor includes a pickle injection needle assembly comprising a number of pickle injection needles. A raw meat feed conveyor extends horizontally for intermittently feeding the masses of raw meat from its one end to the other end through a working station therebetween. The injection needle assembly is installed above the working station of the feed conveyor. The injection needles extend vertically. The injection needles each includes an elongated cylindrical hollow body for directing the pickle and a tip secured to the lower end of the hollow body, the tip of each of the injection needles having a cutting edge. The injection needle assembly is actuated to move between an upper position and a lower position so that the injection needles are engaged and thrust into the masses of raw meat fed onto the working station of the feed conveyor and the fibers of the raw meat are cut by the cutting edge of each of the injection needles. The pickle is supplied into the hollow body of each of the injection needles to be injected into the masses of raw meat when the injection needles are thrust into the masses of raw meat.

13 Claims, 2 Drawing Sheets

Fig. 8

RAW MEAT PROCESSOR

FIELD OF THE INVENTION

The invention relates to a raw meat processor for injecting a pickle into masses of raw meat and cutting the fibers of the raw meat in the manufacturing process of ham and the like.

PRIOR ART

In the manufacturing process of ham and the like, it is required to inject a pickle into masses of raw meat prior to salting the masses of raw meat in a salting tank. This is intended to reduce the salting period of the raw meat and improve the color development and preservability of the raw meat. In addition, it is also required to cut the fibers of the raw meat so that the raw meat is softened to a suitable degree and the pickle is uniformly dispersed and distributed throughout the masses of raw meat.

There has been heretofore provided a raw meat processor for injecting a pickle into the masses of raw meat and cutting the fibers of the raw meat. This raw meat processor includes a raw meat feed conveyor and a pickle injection needle assembly. The feed conveyor extends horizontally for intermittently feeding the masses of raw meat from its one end to the other end through a working station. The injection needle assembly is installed above the working station of the feed conveyor. The injection needle assembly comprises a number of pickle injection needles extending vertically and attached to a pickle injection head. The injection needles each includes an elongated cylindrical hollow body for directing the pickle and a tip secured to the lower end of the hollow body. A plurality of pickle spout holes are formed in the peripheral wall of the hollow body adjacent the tip. The tip is generally cone shaped.

The injection needle assembly is vertically movable between an upper position in which the tips of the injection needles are retracted from the feed conveyor to allow to feed the masses of raw meat and a lower position in which the tips of the injection needles are positioned close to the feed conveyor to engage into the masses of raw meat on the feed conveyor at the working station. In operation, the injection head is actuated by a hydraulic cylinder to move the injection needle assembly between the upper and lower positions so that the injection needles are engaged and thrust into the masses of raw meat fed onto the working station of the feed conveyor. In this connection, the pickle is supplied into the hollow bodies of the injection needles. Accordingly, the pickle is injected into the masses of raw meat through the spout holes of the hollow bodies.

The pickle injector further includes a meat fiber cutting needle assembly installed above the working station of the feed conveyor and disposed downstream of the injection needle assembly. The cutting needle assembly comprises a number of meat fiber cutting needles extending vertically and attached to a meat fiber cutting head. The cutting needles each includes a cutting edge formed at lower end thereof. The cutting edge has a width enough to cut the fibers of the raw meat. The cutting head is actuated by a hydraulic cylinder to move the cutting needle assembly between an upper position and a lower position so that the cutting needles are engaged and thrust into the masses of raw meat fed onto the working station of the feed conveyor. Accordingly, the fibers of the raw meat are cut by the cutting edges of the cutting needles.

However, in this raw meat processor, it is necessary to install not only the pickle injection needles, the pickle injection head and the hydraulic cylinder therefor but also the meat fiber cutting needles, the meat fiber cutting head and the hydraulic cylinder therefor. The prime cost is therefore high. The maintenance cost is also high. In addition, a space is required for the meat fiber cutting needles and meat fiber cutting head besides the pickle injection needles and pickle injection head. The raw meat processor therefore has been over-sized.

SUMMARY OF THE INVENTION

Accordingly, an object of the invention is to provide a novel and improved raw meat processor to overcome the disadvantage of the prior art.

Another object of the invention is to provide a novel and improved raw meat processor for injecting a pickle into the masses of raw meat and cutting the fibers of the raw meat without the meat fiber cutting needles, the meat fiber cutting head and the hydraulic cylinder therefor so that the prime cost and maintenance cost are low and the raw meat processor can be small-sized.

According to the invention, the raw meat processor includes a pickle injection needle assembly comprising a number of pickle injection needles each of which includes an elongated cylindrical hollow body for directing the pickle and a tip secured to the lower end of the hollow body, the tip of each of the injection needles having a cutting edge. The hollow body has pickle outlet means formed in the peripheral wall thereof adjacent the tip for spouting the pickle. When the injection needle assembly is actuated to move between an upper position and a lower position, the injection needles are engaged and thrust into the masses of raw meat fed onto the working station of the feed conveyor and fibers of the raw meat are cut by the cutting edge of each of the injection needles. In this connection, the pickle is supplied into the hollow body of each of the injection needles and injected into the masses of raw meat through the outlet means of the hollow body when the injection needles are thrust into the masses of raw meat.

The outlet means may comprise a plurality of pickle spout holes formed in the peripheral wall of the hollow body of each of the injection needles. The spout holes are preferably spaced circumferentially and axially of the hollow body from each other.

The pickle injection needles may be attached to an pickle injection head. The means for supplying the pickle may include a pickle receiving chamber formed in the injection head, the hollow body of each of the injection needles being communicated at upper end with the receiving chamber in the injection head. The means for actuating the needle assembly comprises a hydraulic cylinder for actuating the injection head, the injection head being operatively connected to and supported by the hydraulic cylinder.

The receiving chamber is preferably connected to a pickle supply hose by means of a valve stem which is adapted to contact with a stop to cut off the pickle from the supply hose when the injection needle assembly is moved to its upper position.

The cutting edge preferably has a width enough to cut the fibers of the masses of raw meat.

The cutting edge may have a width corresponding to the diameter of the hollow body. The cutting edge may have a width larger or less than the diameter of the hollow body.

BRIEF DESCRIPTION OF THE DRAWINGS

FIGS. 6 to 11 are enlarged front views of other embodiments of the pickle injection needle according to the invention respectively.

DESCRIPTION OF THE PREFERRED EMBODIMENT

Figure 1:
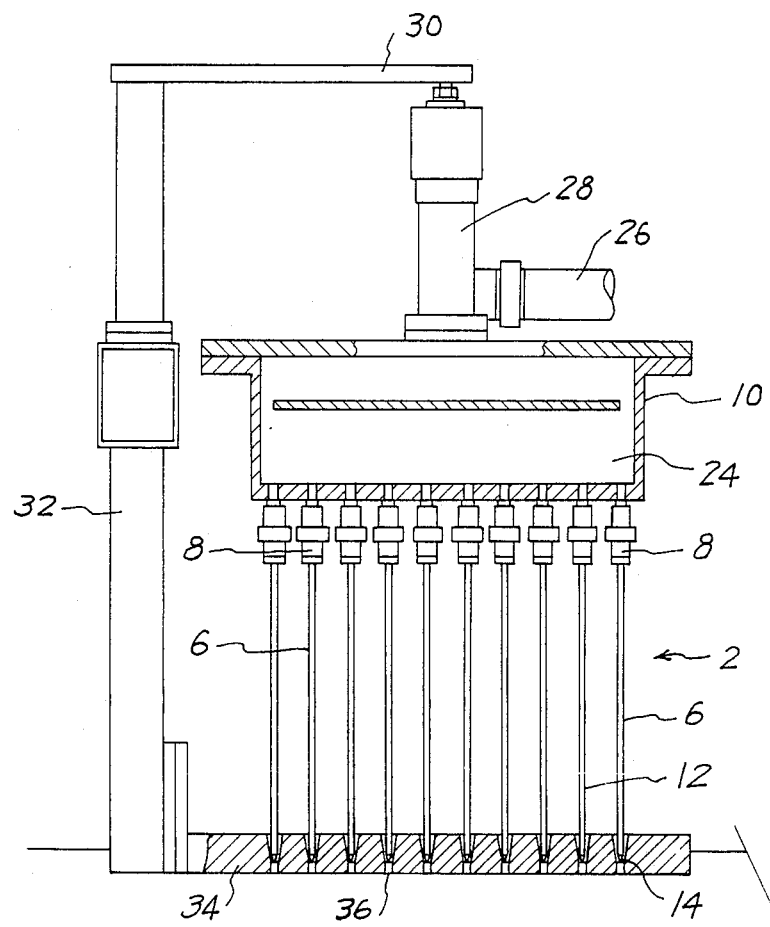
FIG. 1 is a side view showing a raw meat processor according to the invention.
Figure 1:
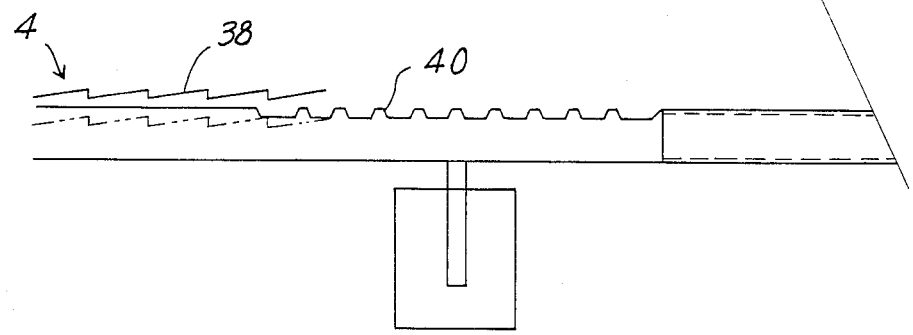

Referring to FIG. 1, a raw meat processor including a pickle injection needle assembly 2 according to the invention is shown. A raw meat feed conveyor 4 extends horizontally for intermittently feeding the masses of raw meat from its one end to the other end through a working station therebetween. The injection needle assembly 2 is installed above the working station of the feed conveyor 4. The injection needle assembly 2 comprises a number of pickle injection needles 6 extending vertically and a number of couplers 8 secured to a pickle injection head 10. The injection needles 6 are attached at their upper ends to the couplers 8 of the injection head 10 for removal respectively.

Figure 2:
FIG. 2 is a side view showing a pickle injection needle used in the raw meat processor in FIG. 1.
Figure 3:
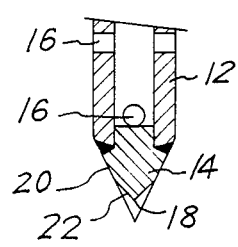
FIG. 3 is a enlarged sectional view of the injection needle in FIG. 2.

The injection needles 6 each comprises an elongated cylindrical hollow body 12 for directing the pickle and a tip 14 secured to the lower end of the hollow body 12 by welding or press fitting, as shown in FIGS. 2 and 3. The hollow body 12 has pickle outlet means comprising a plurality of pickle spout holes 16 formed in the peripheral wall of the hollow body 12 adjacent the tip 14 of the injection needle 6. The spout holes 16 are spaced circumferentially and axially of the hollow body 12 from each other.

Figure 4:
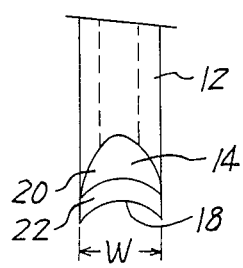
FIG. 4 is a enlarged front view of the injection needle in FIG. 2.
Figure 5:
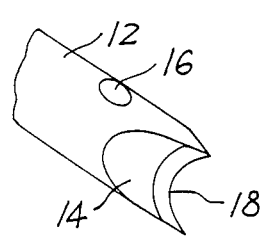
FIG. 5 is a perspective view of the injection needle in FIG. 2.

Further, the tip 14 of each of the injection needles 6 has a cutting edge 18. The cutting edge 18 has a width W enough to cut the fibers of the raw meat as shown in FIGS. 4 and 5. In this embodiment, the tip 14 includes a pair of faces 20 converging axially and a pair of faces 22 converging axially to form the cutting edge 18. The cutting edge 18 has a width W corresponding to the diameter of the hollow body 12 and is arcuately curved.

In machining the tip 14, it is preferable to use a solid rod as the tip 14 and weld or press fit it into the lower end of the hollow body 12. The hollow body 12 comprises an elongated cylindrical hollow pipe. The solid rod has a diameter corresponding to that of the hollow body 12. Accordingly, the steps of machining the faces 20 and machining the faces 22 by a milling cutter can form the cutting edge 18 having a width W corresponding to the diameter of the hollow body 12.

The injection needle assembly 2 is vertically movable between an upper position in which the tips 14 of the injection needles 6 are retracted from the feed conveyor 4 to allow to feed the masses of raw meat on the feed conveyor 4 and a lower position in which the tips 14 of the injection needles 6 are positioned close to the feed conveyor 4 to engage into the masses of raw meat on the feed conveyor 4 at the working station. In this connection, the injection head 10 is operatively connected to and supported by a hydraulic cylinder, a control valve being provided in the hydraulic circuit for the hydraulic cylinder and connected to a control device. The injection head 10 is actuated by the hydraulic cylinder in response to a signal from the control device to move the injection needle assembly 2 between the upper and lower positions.

The injection head 10 has a pickle receiving chamber 24 formed therein, the hollow body 12 of each of the injection needles 6 being communicated with the receiving chamber 24. The receiving chamber 24 is connected to a pickle supply hose 26 by means of a valve stem contained in a valve casing 28. The valve stem is adapted to contact with a stop 30 to cut off the pickle from the supply hose 26. The stop 30 is fixed to a pillar 32.

Further, the raw meat processor includes a needle guide plate 34 having a number of needle receiving holes 36 and extending horizontally. The guide plate 34 is fixed to the pillar 32. The injection needles 6 are inserted into and guided by the receiving holes 36 of the guide plate 34.

The feed conveyor 4 comprises a movable plate 38 and a fixed plate 40. The masses of raw meat are disposed on the movable plate 38 and the fixed plate 40. The movable plate 38 is actuated by a hydraulic cylinder and a linkage to rise above the fixed plate 40 and advance horizontally so that the masses of raw meat is lifted from the fixed plate 40 and horizontally fed by the movable plate 38. The movable plate 38 is then lowered below the fixed plate 40 so that the masses of raw meat are disposed again on the fixed plate 40. The movable plate 38 then returns horizontally to the original position. Accordingly, the raw meat can be intermittently fed over a distance corresponding to the advancing stroke of the movable plate 38 each time.

In this raw meat processor, whenever the raw meat is fed over a distance and disposed on the fixed plate 40 of the feed conveyor 4, the injection head 10 is actuated by the hydraulic cylinder in timed relationship with the movable plate 38 of the feed conveyor 4 to move the injection needle assembly 2 from the upper position to the lower position thereof. The valve stem in the valve casing 28 is also moved with the injection head 10 and leaves the stop 30 so that the pickle is directed into the receiving chamber 24 of the injection head 10 through the supply hose 26 and the valve stem and introduced into the hollow bodies 12 of the injection needles 6.

Accordingly, the injection needles 6 are engaged and thrust into the masses of raw meat fed onto the working station of the feed conveyor 4. The fibers of the raw meat are cut by the cutting edges 18 of the injection needles 6. The masses of raw meat are therefore softened to a suitable degree. In addition, the pickle is supplied into the hollow bodies 12 of the injection needles 6, spouted from the spout holes 16 and injected into the masses of raw meat when the injection needles 6 are thrust into the masses of raw meat. The pickle can be dispersed and distributed throughout the masses of raw meat since the fibers of the raw meat are cut.

Thereafter, the injection head 10 is actuated by the hydraulic cylinder to move the injection needle assembly 2 to the upper position thereof. Accordingly, the tips 14 of the injection needles 6 are retracted from the feed conveyor 4 and withdrawn from the masses of raw meat to allow to feed the masses of raw meat on the feed conveyor 4. The valve stem in the valve casing 28 contacts with the stop 30 to cut off the pickle from the supply hose 26.

Accordingly, the raw meat processor can inject the pickle into the masses of raw meat and cut the fibers of the raw meat by only the injection needles 6. It is not required to additionally install the meat fiber cutting needles, the meat fiber cutting head and the hydraulic cylinder therefor in the prior art. The prime cost and the maintenance cost are therefore low. A space is not required for the meat fiber cutting needles and meat fiber cutting head so that the pickle injector can be small-sized.

Figure 6:
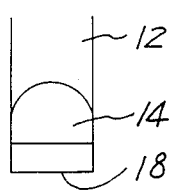
Figure 7:
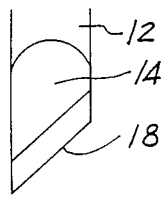
Figure 9:
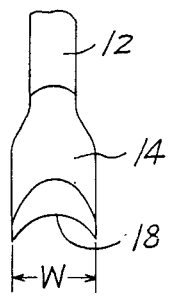
Figure 10:
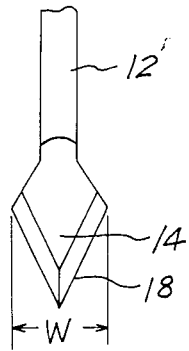
Figure 11:
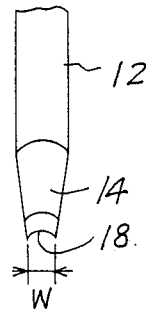

As to the cutting edge 18 of the injection needle 6 according to the invention, it may have different configurations as shown in FIGS. 6 to 8. In addition, the cutting edge 18 may have a width W larger than the diameter of the hollow body 12 as shown in FIGS. 9 and 10. The cutting edge 18 may have a width W less than the diameter of the hollow body 12 as shown in FIG. 11. The injection needle 6 having anyone of these cutting edges 18 can inject the pickle into the masses of raw meat and cut the fibers of the raw meat.

What is claimed is:

1. A raw meat processor for cutting meat fibers of masses of raw meat and for simultaneously injecting a pickle solution into the cut meat masses, comprising:
   (A) intermittent conveyor means for conveying the raw meat masses along a longitudinal direction into a cutting pickling workstation, and for conveying cut and pickled meat masses away from the workstation after a time interval has elapsed;
   (B) a needle assembly including a plurality of needles at the workstation and movable in common along a transverse direction generally perpendicular to the longitudinal direction toward and away from the conveyor means, each needle including
      (i) a transversely elongated cylindrical hollow body having leading and trailing ends and an interior channel that extends between said ends along an axis lengthwise of a respective needle and that has an interior diameter, said body having discharge openings that extend through the body radially of the axis, said discharge openings being in fluid communication with the interior channel, and
      (ii) a cutting tip secured to the leading end of a respective needle, said tip having a solid, rod-shaped, cylindrical stub that has an outer diameter that matches the interior diameter of the interior channel and that is fitted into the leading end of a respective body, said tip further having a pair of opposite bevelled faces intersecting along a cutting edge having a predetermined width;
   (c) drive means for transversely moving the needle assembly between a raised position remote from the raw meat masses in the workstation, and a lowered position in which the raw meat masses are cut by the tips of the needles thrust into the raw meat masses; and
   (D) supply means for supplying a pickle solution to the trailing ends of the needles for passage along each interior channel and for discharge through the openings of each needle when the needle assembly is in its lowered position.

2. The processor as recited in claim 1, wherein each stub is press-fitted into the leading end of a respective body.

3. The processor as recited in claim 1, wherein each stub is welded onto the leading end of a respective body.

4. The processor as recited in claim 1, wherein each body has an outer width, and wherein the predetermined width of each cutting edge is equal to the outer width of a respective body.

5. The processor as recited in claim 1, wherein each body has an outer width, and wherein the predetermined width of each cutting edge is larger than the outer width of a respective body.

6. The processor as recited in claim 1, wherein each body has an outer width, and wherein the predetermined width of each cutting edge is smaller than the outer width of a respective body.

7. The processor as recited in claim 1, wherein the cutting edge is linear.

8. The processor as recited in claim 1, wherein the cutting edge is arcuate.

9. The processor as recited in claim 1, wherein the cutting edge is V-shaped.

10. The processor as recited in claim 1, wherein each tip has an additional pair of opposite bevelled faces adjacent the first-mentioned pair of faces, said first-mentioned pair of faces converging toward each other and bounding a first solid angle therebetween, said additional pair of faces converging toward each other and bounding a second solid angle therebetween that is different from said first angle.

11. The processor as recited in claim 1, wherein the discharge openings are spaced circumferentially and axially apart of one another.

12. The processor as set forth in claim 1, wherein said needles are attached to an injection head, said means for supplying including a receiving chamber formed in said injection head, said hollow body of each of said needles communicating with said receiving chamber, said drive means comprising a hydraulic cylinder for actuating said injection head, said injection head being operatively connected to and supported by said hydraulic cylinder.

13. The processor as set forth in claim 10, wherein said receiving chamber is connected to a supply hose by means of a valve stem which is adapted to contact with a stop to cut off the pickle solution from the supply hose when said needle assembly is moved to said raised position.

* * * * *